(12) United States Patent
Isono

(10) Patent No.: US 8,042,585 B2
(45) Date of Patent: Oct. 25, 2011

(54) APPARATUS FOR CONTROLLING TIRE INFLATION PRESSURE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 49 days.

(21) Appl. No.: 12/160,113

(22) PCT Filed: Dec. 26, 2006

(86) PCT No.: PCT/JP2006/326347
§ 371 (c)(1),
(2), (4) Date: Jul. 7, 2008

(87) PCT Pub. No.: WO2007/083514
PCT Pub. Date: Jul. 26, 2007

(65) Prior Publication Data
US 2009/0000716 A1    Jan. 1, 2009

(30) Foreign Application Priority Data
Jan. 19, 2006    (JP) ................... 2006-011374

(51) Int. Cl.
*B60C 23/12* (2006.01)
(52) U.S. Cl. .................. 152/416; 152/417
(58) Field of Classification Search ............ 152/415, 152/416, 417, 418
See application file for complete search history.

(56) References Cited

U.S. PATENT DOCUMENTS

| | | | | |
|---|---|---|---|---|
| 1,788,699 A | * | 1/1931 | Zinsitz | 152/417 |
| 2,017,158 A | * | 10/1935 | Mosser et al. | 152/417 |
| 2,452,527 A | * | 10/1948 | Peter | 152/417 |
| 2,634,784 A | * | 4/1953 | Fitch | 152/417 |
| 2,976,906 A | * | 3/1961 | Kamm et al. | 152/417 |
| 4,705,090 A | * | 11/1987 | Bartos | 152/417 |
| 4,892,128 A | * | 1/1990 | Bartos | 152/417 |
| 5,221,381 A | | 6/1993 | Hurrell, II | |
| 5,868,881 A | * | 2/1999 | Bradley | 152/417 |
| 5,979,526 A | * | 11/1999 | Chamoy | 152/417 |
| 6,497,262 B1 | * | 12/2002 | Skoff et al. | 152/415 |
| 2005/0205182 A1 | * | 9/2005 | Maquaire et al. | 152/417 |
| 2009/0205764 A1 | * | 8/2009 | Pionke | 152/427 |

FOREIGN PATENT DOCUMENTS

| | | | |
|---|---|---|---|
| DE | 199 61 020 | | 6/2000 |
| GB | 2178705 A | * | 2/1987 |
| JP | 61 169304 | | 7/1986 |
| JP | 62004617 A | * | 1/1987 |
| JP | 6 507860 | | 9/1994 |
| JP | 11 139118 | | 5/1999 |
| JP | 11 509157 | | 8/1999 |
| JP | 2002 514540 | | 5/2002 |
| JP | 2005-313738 | | 11/2005 |

* cited by examiner

Primary Examiner — Russell Stormer
(74) Attorney, Agent, or Firm — Oblon, Spivak, McClelland, Maier & Neustadt, L.L.P.

(57) ABSTRACT

An apparatus for controlling tire inflation pressure includes an outlet side end portion of a supplying passageway provided in an axle hub that is opened on an outer end surface of a vehicle in a flange portion of the axle hub, and an inlet side end portion of an introducing passageway provided in a wheel that is opened on an inner end surface of the vehicle in the wheel of a vehicle wheel assembly, and by mounting the wheel onto the flange portion, the outlet side end portion and the inlet side end portion are air tightly joined each other. Thus, easiness in mounting the vehicle wheel assembly relative to the flange portion of the axle hub can be improved.

10 Claims, 4 Drawing Sheets

APPARATUS FOR CONTROLLING TIRE INFLATION PRESSURE

TECHNICAL FIELD

The present invention relates to an apparatus for controlling tire inflation pressure (a tire inflation pressure introducing apparatus), especially, to an apparatus for controlling tire inflation pressure which is constructed in such a manner that pressurized air supplied from a pressure generating device is introduced into a tire air chamber of a vehicle wheel assembly through at least a supplying passageway provided in an axle hub and an introducing passageway provided in a wheel of the vehicle wheel assembly removably mounted onto a flange portion of the axle hub.

BACKGROUND ART

An apparatus for controlling tire inflation pressure of this kind is disclosed, for example, in Japanese. Patent Application Laid-Open (kokai) No. Hei 11-139118 (hereinafter referred to as Patent Document 1). In the apparatus for controlling tire inflation pressure described in the Patent Document 1, the pressurized air supplied from the pressure generating device can be introduced (supplied) into the tire air chamber of the vehicle wheel assembly, and accordingly, the air pressure in the tire air chamber can be secured.

Meanwhile, the apparatus for controlling tire inflation pressure described in the Patent Document 1 is constructed in such a manner that the supplying passageway provided in the axle hub is communicatively connected to the introducing passageway provided in the wheel of the vehicle wheel assembly though an air tube. Therefore, when the vehicle wheel assembly is being mounted onto the flange portion of the axle hub, it is required to relatively adjust a position of the supplying passageway provided in the axle hub to a position of the introducing passageway provided in the wheel of the vehicle wheel assembly, and to communicatively connect the supplying passageway provided in the axle hub to the introducing passageway provided in the wheel of the vehicle wheel assembly through the air tube, leaving room for improvement due to difficulties in mounting.

DISCLOSURE OF THE INVENTION

The present invention is intended to solve the problems described above to provide an apparatus for controlling tire inflation pressure constructed in such a manner that pressurized air supplied from a pressure generating device is introduced into a tire air chamber of a vehicle wheel assembly through a supplying passageway provided in an axle hub and through an introducing passageway provided in a wheel of the vehicle wheel assembly which is removably mounted onto a flange portion of the axle hub, characterized in that an outlet side end portion of the supplying passageway is opened on an outer end surface of a vehicle in the flange portion of the axle hub, and an inlet side end portion of the introducing passageway is opened on an inner end surface of the vehicle in the wheel of the vehicle wheel assembly, and the outlet side end portion of the supplying passageway and the inlet side end portion of the introducing passageway are air tightly joined each other by (or when) mounting the wheel of the vehicle wheel assembly onto the flange portion of the axle hub.

In this apparatus for controlling tire inflation pressure, the outlet side end portion of the supplying passageway is opened on the outer end surface of the vehicle in the flange portion of the axle hub, and the inlet side end portion of the introducing passageway is opened on the inner end surface of the vehicle in the wheel of the vehicle wheel assembly, and the outlet side end portion of the supplying passageway and the inlet side end portion of the introducing passageway are air tightly joined each other by mounting the wheel of the vehicle wheel assembly onto the flange portion of the axle hub. Therefore, when the vehicle wheel assembly is being mounted onto the flange portion of the axle hub, it is possible to improve easiness in mounting the vehicle wheel assembly onto the flange portion of the axle hub, compared with the conventional apparatus wherein the supplying passageway must be communicatively connected with the introducing passageway through the air tube.

In this case, it is preferable that a plurality of the outlet side end portions of the supplying passageway and a plurality of the inlet side end portions of the introducing passageway be provided and that the outlet side end portions and the inlet side end portions be arranged at equiangular intervals so as to mach with (or so as to be in accordance with) a mounting phase of the vehicle wheel assembly relative to the axle hub (i.e., relative angular positions between the vehicle wheel assembly and the axle hub, which is typically determined by intervals in the circumferential direction of hub bolts mounted onto the flange portion of the axle hub). In this case, when the vehicle wheel assembly is being mounted onto the flange portion of the axle hub, it is possible to further improve the easiness in mounting (or assembling) the vehicle wheel assembly onto the flange portion of the axle hub, since relative adjustments are automatically performed between positions of the outlet side end portions of the supplying passageways and the inlet side end portions of the introducing passageways.

Also, in the practice of the present invention, it is preferable that an annular passageway, which communicates the outlet side end portion of the supplying passageway with the inlet side end portion of the introducing passageway, be provided at a joining portion of the vehicle outer end surface of the flange portion of the axle hub and the vehicle inner end surface of the wheel of the vehicle wheel assembly. In this case, even if the number of the outlet side end portion of the supplying passageway is one and the number of the inlet side end portion of the introducing passageway is one, it is not required to relatively adjust the position of the outlet side end portion of the supplying passageway to the position of the inlet side end portion of the introducing passageway. The reason is that even if the positions of the outlet side end portion of the supplying passageway and of the inlet side end portion of the introducing passageway are not relatively adjusted in mounting the vehicle wheel assembly onto the flange portion of the axle hub, the outlet side end portion of the supplying passageway can be communicatively connected to the inlet side end portion of the introducing passageway through the annular communicating passageway. Accordingly, it is possible to favorably improve the easiness in mounting the vehicle wheel assembly onto the flange portion of the axle hub.

Moreover, when a plurality of the outlet side end portions of the supplying passageway and a plurality of the inlet side end portions of the introducing passageway are provided, the similar effects can be expected since it is not required to adjust relative positions between the outlet side end portions of the supplying passageways and the inlet side end portions of the introducing passageways in a similar manner as described above. At the same time, only two of sealing members are required (i.e., it is necessary to have only one ring-shaped (or annular) sealing member provided along an outer circumference of the annular communicating passageway and only one ring-shaped (or annular) sealing member provided along an inner circumference of the annular communicating passageway), regardless of the number of the outlet side end portions of the supplying passageways and the inlet side end portions of the introducing passageways (i.e., if each of the number is four and the annular communicating passageway is not provided, four sealing members are required in total). Thus, the apparatus can have a simple structure.

Furthermore, in the practice of the present invention, it is also preferable that sealing means be provided in the inlet side end portion of the introducing passageway, the sealing means opening the introducing passageway by (or when) mounting the vehicle wheel assembly onto the axle hub and closing air tightly the introducing passageway by (or when) removing the vehicle wheel assembly from the axle hub. In this case, the sealing means may be a check valve comprising a ball valve. In this instance, even when the vehicle wheel assembly is removed from the axle hub, the air pressure in the tire air chamber is maintained, since the sealing means air tightly closes the introducing passageway provided in the wheel of the vehicle wheel assembly.

BEST MODE FOR CARRYING OUT THE INVENTION

Figure 1:
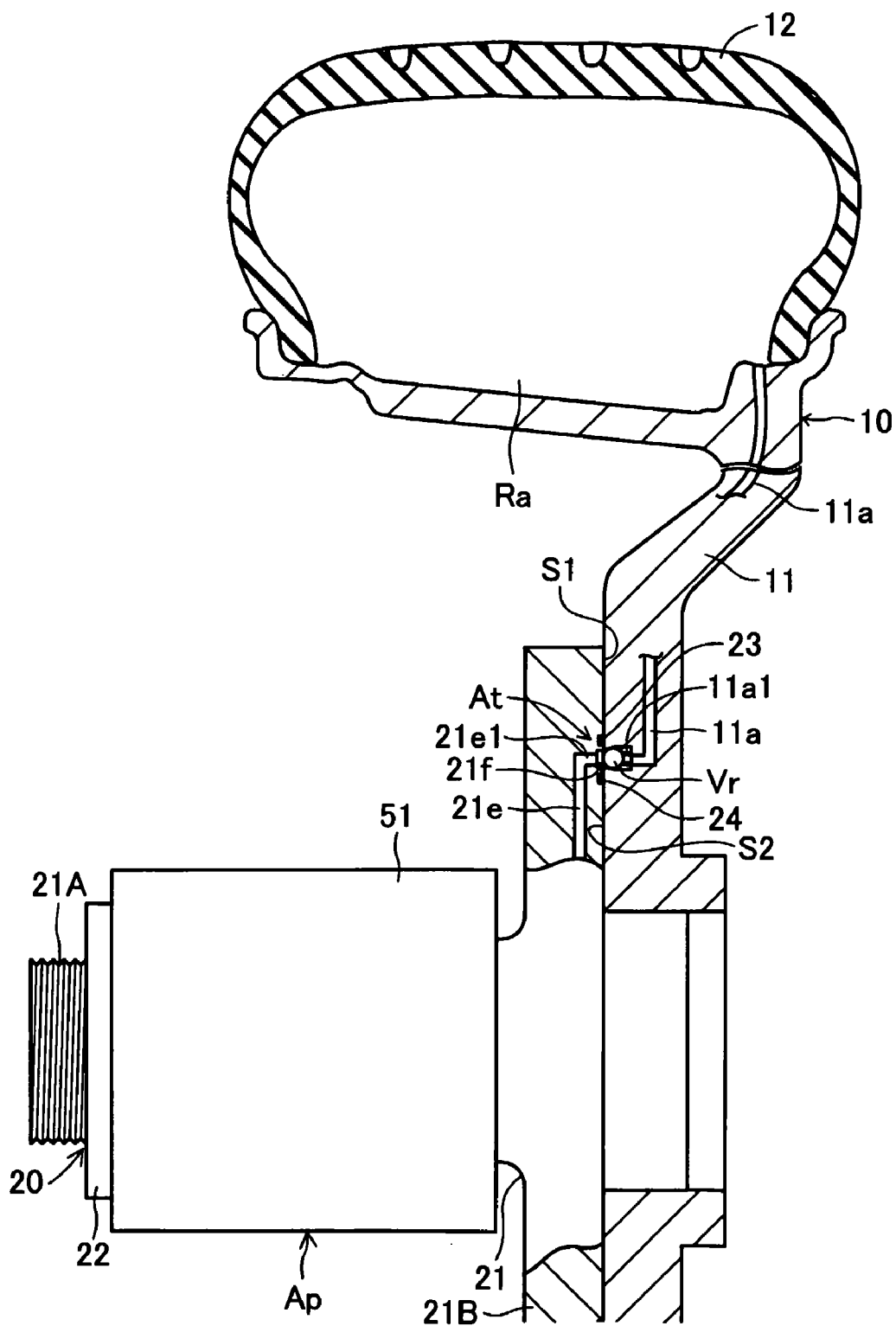
FIG. 1 is a fragmentary, cutaway front view schematically showing an embodiment of an apparatus for controlling tire inflation pressure according to the present invention.
Figure 2:
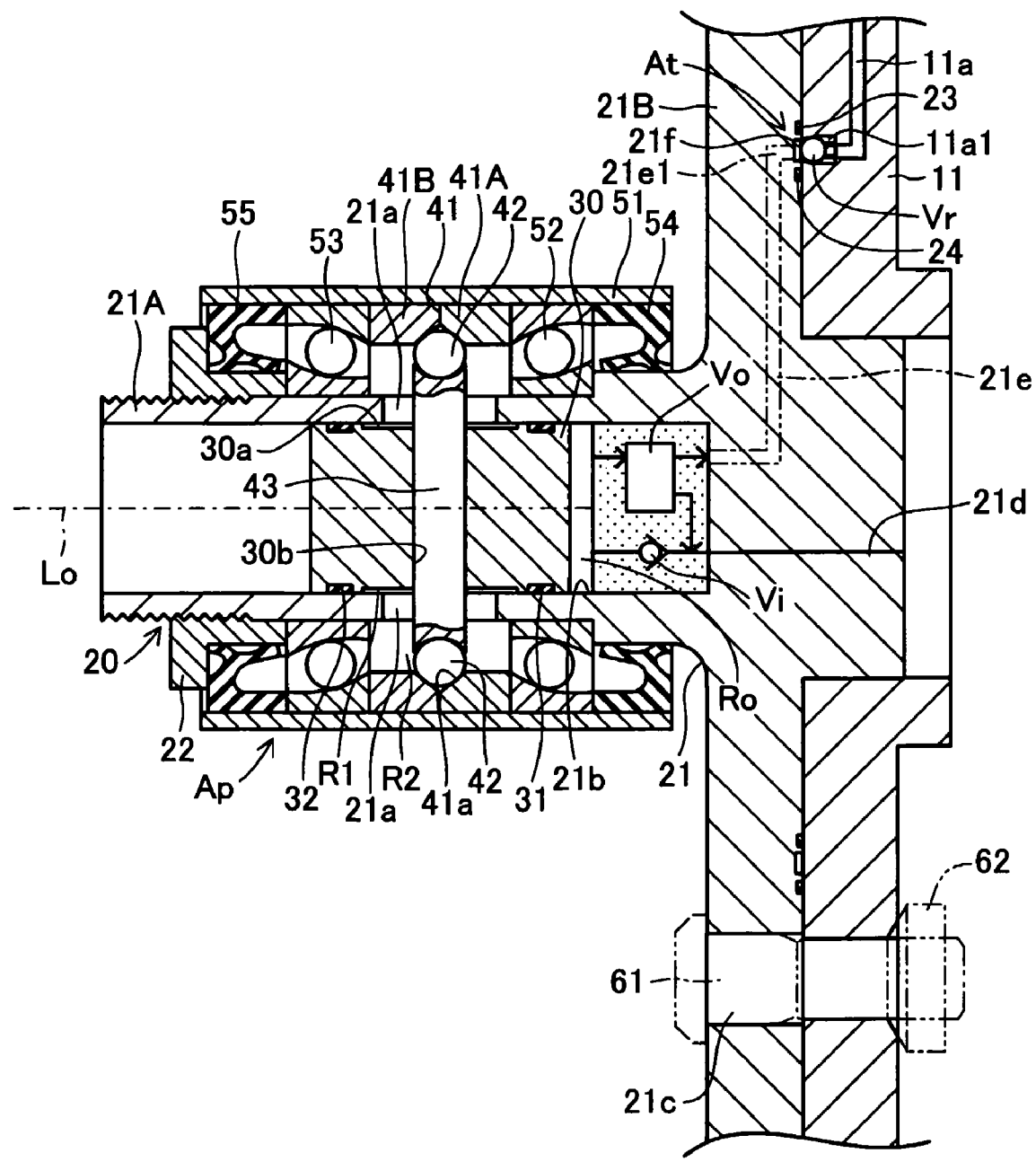
FIG. 2 is an enlarged sectional view of the apparatus for controlling tire inflation pressure and a pressure generating device shown in FIG. 1.

An embodiment according to the present invention will next be described based on the drawings. FIGS. 1 and 2 schematically show a pressure generating device Ap capable of generating pressurized air with a rotation of an axle hub 20 and an apparatus At for controlling tire inflation pressure (a tire inflation pressure introducing apparatus) which introduces the pressurized air supplied from the pressure generating device Ap into a tire air chamber Ra formed by a wheel 11 and a tire 12 of a vehicle wheel assembly 10. The vehicle wheel assembly 10 is removably mounted onto a disc-shaped flange portion 21B of the axle hub 20 at the wheel 11. It should be noted that the apparatus At for controlling tire inflation pressure is constructed in such a manner that the pressurized air supplied from the pressure generating device Ap is introduced into the tire air chamber Ra of the vehicle wheel assembly 10 through supplying passageways 21e provided in the axle hub 20 and introducing passageways 11a provided in the wheel 11 of the vehicle wheel assembly 10.

The pressure generating device Ap comprises a cylindrical support-portion 51 which is a part of a knuckle as a supporting member, the axle hub 20 as a rotating member and a column-shaped piston 30 as a pump-operating member, and further comprises a cam member 41 and cam followers 42 serving as a motion converting mechanism which converts a rotational motion of the axle hub 20 against the cylindrical support-portion 51 into a reciprocal motion of the piston 30, and a rod 43 which rotatably supports the cam followers 42.

The cylindrical support-portion 51 is formed to have a cylindrical shape whose center is along an axis line Lo and is incapable of rotating around the axis line Lo. Inside the cylindrical support-portion 51, the axle hub 20 is fluid tightly supported rotatably around the axis line Lo through a pair of bearings 52, 53 and a pair of ring-shaped (or annular) sealing members 54, 55. The pair of bearings 52, 53 is arranged with a predetermined distance in an axial direction (in a direction along the axis line Lo) and disposed between the cylindrical support-portion 51 and the axle hub 20 in such a manner as to sandwich the cam member 41 in the axial direction to allow the axle hub 20 to rotate around the cylindrical support-portion 51, namely, the knuckle. The pair of ring-shaped sealing members 54, 55 are arranged with a predetermined distance in the axial direction and disposed between the cylindrical support-portion 51 and the axle hub 20 in such a manner as to sandwich the cam member 41 and both of the bearings 52, 53 in the axial direction to thereby provide fluid tight seal between the cylindrical support-portion 51 and the axle hub 20.

The axle hub 20 comprises a hub body 21 and a sleeve 22 screwed fluid tightly on an outer circumference of the hub body 21 at its inner end portion of the vehicle. The hub body 21 comprises a rotating axle portion 21A and the disc-shaped flange portion 21B. A pair of axial direction-long holes 21a (i.e., holes 21a elongated along the axial direction) and a cylindrical bore 21b are formed in the rotating axle portion 21A. Mounting-hole portions 21c to mount the vehicle assembly wheel 10 are formed in the disc-shaped flange portion 21B. An intake passageway 21d and supplying passageways 21e are formed in the rotating axle portion 21A and the disc-shaped flange portion 21B.

The axial direction-long holes 21a form a guiding means which enables the piston 30, the cam followers 42, and the rod 43 to rotate together with the axle hub 20 and to reciprocate in the axial direction. The axial direction-long holes 21a are formed so as to be arranged at (or with) an interval of 180 degrees along the circumferential direction of the rotating axle portion 21A in the axle hub 20. The cylinder bore 21b accommodates the piston 30 and forms a pump chamber Ro in the rotating axle portion 21A together with the piston 30.

Figure 3:
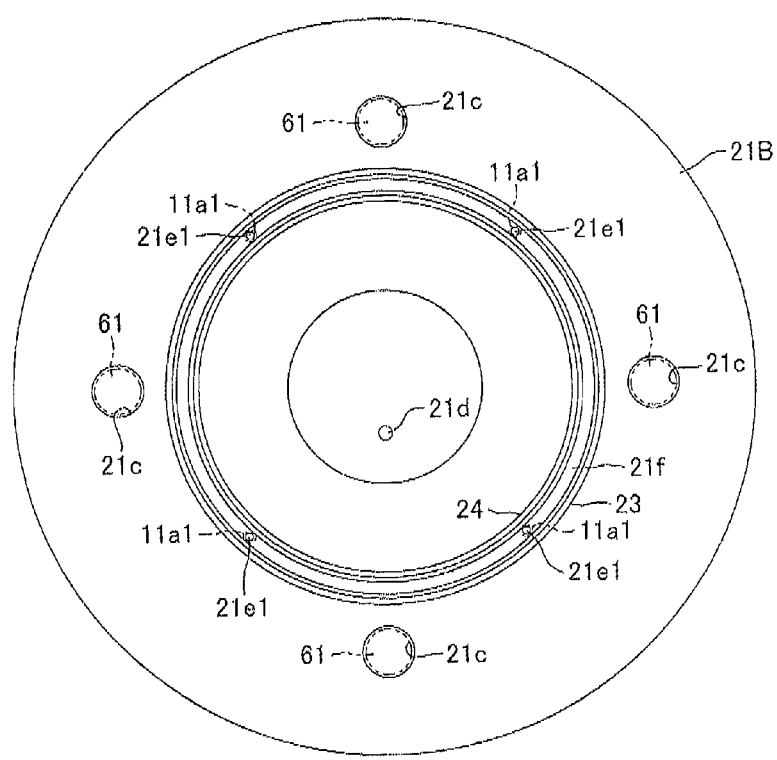
FIG. 3 is a side view from the outside of an axle hub shown in FIGS. 1 and 2.

As shown in FIG. 3, the mounting-hole portions 21c are formed so as to be arranged at four positions at intervals of 90 degrees (with equiangular intervals) along the circumferential direction. Hub bolts 61 are fitted (or inserted) into the mounting-hole portions 21c to be fixed in such a manner as to penetrate the mounting-hole portions 21c (refer to FIGS. 2 and 3). It should be noted that the vehicle wheel assembly 10 is fastened onto the axle hub 20 through the four hub bolts 61 and hub nuts 62 (refer to FIG. 2) screwed onto each hub bolt 61.

The intake passageway 21d is intended to introduce air into the pump chamber Ro. An intake check valve Vi is disposed in the intake passageway 21d. The supplying passageways 21e are intended to supply the pressurized air discharged from the pump chamber Ro into the introducing passageways 11a provided in the wheel 11 of the vehicle wheel assembly 10. A control valve Vo is disposed in each of the introducing passageways 21e.

The control valve Vo is a change-over valve which operates depending on the pressure in the supplying passageways 21e. The control valve Vo causes the pump chamber Ro to communicate with the supplying passageways 21e while causing the pump chamber Ro to be disconnected with the intake passageway 21d, when the pressure in each of the supplying passageways 21e is less than a predetermined set value. The control valve Vo causes the pump chamber Ro to communicate with the intake passageway 21*d* while causing the pump chamber Ro to be disconnected with the supplying passageways 21*e*, when the pressure in each of the supplying passageways 21*e* is equal to or larger than the predetermined set value.

The piston 30 is inserted in the cylinder bore 21*b* of the rotating axle-portion 21A in the axle hub 20 through a pair of ring-shaped sealing members 31, 32 and is configured (or mounted) in such a manner as to be capable of rotating concentrically together with the rotating axle-portion 21A of the axle hub 20 and to be capable of reciprocating in the axial direction of the rotating axle-portion 21A of the axle hub 20. Also, an annular groove 30*a* and a through-hole 30*b* extending in a radial direction of the piston 30 are formed in the piston 30. The pair of ring-shaped sealing members 31, 32 is disposed at a predetermined distance in the axial direction and interposed between the piston 30 and the rotating axle portion 21A at end portions in the axial direction of the piston 30. The pair of ring-shaped sealing members 31, 32 provides air and fluid tight seals between the piston 30 and the rotating axle-portion 21A.

The annular groove 30*a* is formed on an outer circumference of the piston 30 between the pair of ring-shaped sealing members 31, 32 and forms an annular space R1 between the piston 30 and the rotating axle portion 21A. This annular space RI is communicatively connected to an annular space R2 formed between the pair of ring-shaped sealing members 54, 55 through each axial direction-long hole 21*a* formed in the rotating axle portion 21A. The volume of each of the annular space R1, R2 does not vary, even when the piston 30 reciprocates in the axial direction. The annular spaces RI, R2 are sealed by the four sealing members 54, 55, 31, 32. Also, the annular spaces R1, R2 or the like form oil chambers which accommodate a predetermined amount of lubricant. These oil chambers accommodate the bearings 52, 53, the cam member 41, the cam followers 42 or the like.

The cam member 41 is a cylindrical cam integrally (impossible to move in the axial direction and to rotate) provided in the cylindrical support-portion 51. The cam member 41 comprises a pair of cam sleeves 41A, 41 B which are connected each other in the axial direction and is concentrically arranged about the rotating axle portion 21A. Also, the cam member 41 has an annular cam portion 41*a* which forms a cam groove whose track fluctuates in the axial direction. The cam followers 42 are fitted with the cam groove. The cam portion 41*a* has a cam surface which receives load in the axial direction from the cam followers 42 (i.e., load in the horizontal direction in FIG. 2) and load in the radial direction (i.e., load in the vertical direction in FIG. 2). The cross-sectional shape of this cam surface is V-shaped. The cam surface is configured so as to fluctuate with even-numbered cycles (e.g., two cycles) in the circumferential direction of the rotating axle portion 21A.

The cam followers 42 are balls rotatably mounted at outer ends in the radial direction of the piston of the rod 43. The cam followers 42 are engaged with the cam portion 41*a* (i.e., cam groove) at end portions in the radial direction of the piston which is perpendicular to the axis line Lo and are capable of moving in the axial direction (in the horizontal direction in FIG. 2) together with the rod 43 by rotating about the cam member 41. The rod 43 is a load transfer that is movably mounted in the through-hole 30*b* in the radial direction of the piston 30 (in the axial direction of the through-hole 30*b*). The rod 43 penetrates the axial direction-long holes 21*a* in such a manner as to be capable of moving in the axial direction and to be incapable of moving in the rotational direction.

Meanwhile, the apparatus At for controlling tire inflation pressure according to this embodiment is constructed such that, as shown in FIGS. 1 and 2, the outlet side end portions 21*e*1 of the supplying passageways 21*e* are opened on the outer end surface S1 of the disc-shaped flange portion 21 B of the axle hub 20, and the inlet side end portions 11 all of the introducing passageways 11 a are opened on the inner end surface S2 of the vehicle in the wheel 11 of the vehicle wheel assembly 10, and by (or when) mounting the wheel 11 of the vehicle wheel assembly 10 onto the disc-shaped flange portion 21B of the axle hub 20, the outlet side end portions 21*e*1 of the supplying passageways 21*e* and the inlet side end portions 11*a*1 of the introducing passageways 11*a* are air tightly joined each other (communicatively connected).

The outlet side end portions 21*e*1 of the supplying passageways 21*e* are formed at four positions as shown in FIG. 3 and arranged at equiangular intervals so as to match with a mounting phase of the vehicle wheel assembly 10 relative to the axle hub 20 (i.e., the intervals of 90 degrees with the phase difference of 45 degrees in the circumferential direction). The inlet side end portions 11*a*1 of the introducing passageways 11*a* are formed, as shown in FIGS. 1 and 2, at four positions at the intervals of 90 degrees in the circumferential direction in a similar manner as the outlet side end portions 21*e*1 of the supplying passageways 21*e* so as to face respectively to (or respectively be opposed to) the outlet side end portions 21*e*1 of the supplying passageways 21*e*.

Also, in this embodiment, at a joining portion between the outer end surface S1 of the vehicle in the disc-shaped flange portion 21 B of the axle hub 20 and the inner end surface S2 of the wheel 11 of the vehicle wheel assembly 10, an annular (a ring-shaped) groove 21*f* (communicatively connected passageway) is formed which communicatively connects the outlet side end portions 21*e*1 of the supplying passageways 21*e* with the inlet side end portions 11*a*1 of the introducing passageways 11*a*. Further, sealing members 23, 24 for sealing the annular communicatively connected groove 21*f* air tightly are mounted onto the disc-shaped flange portion 21B.

Figure 4A:
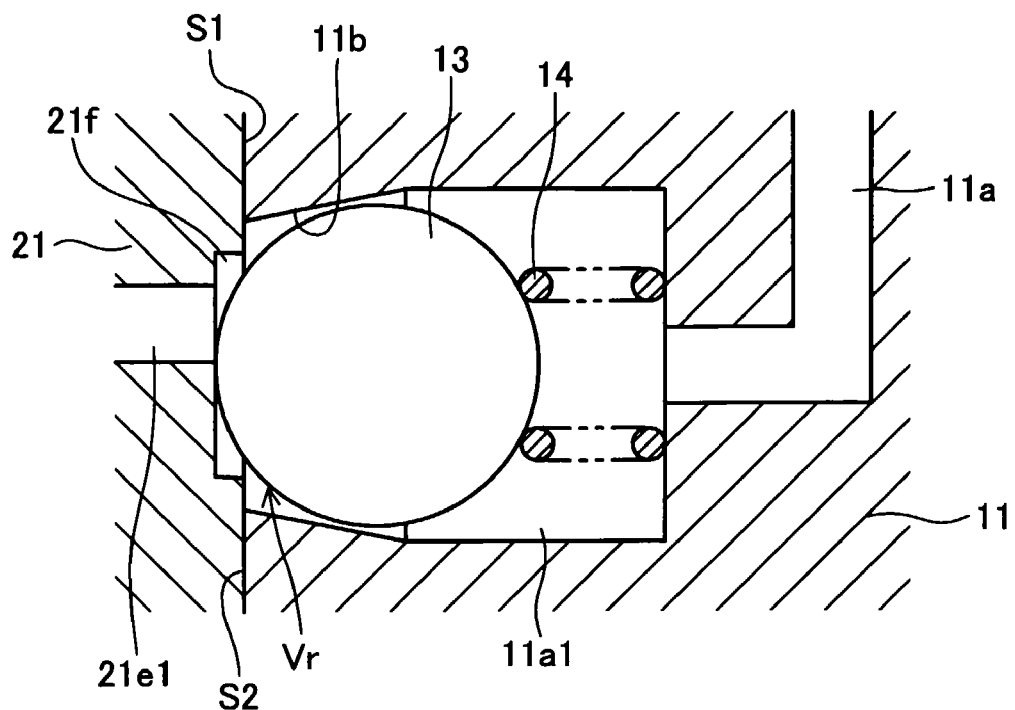
FIGS. 4A and 4B are enlarged sectional views showing the operation (function) of a check valve mounted in a wheel of a vehicle wheel assembly.
Figure 4B:
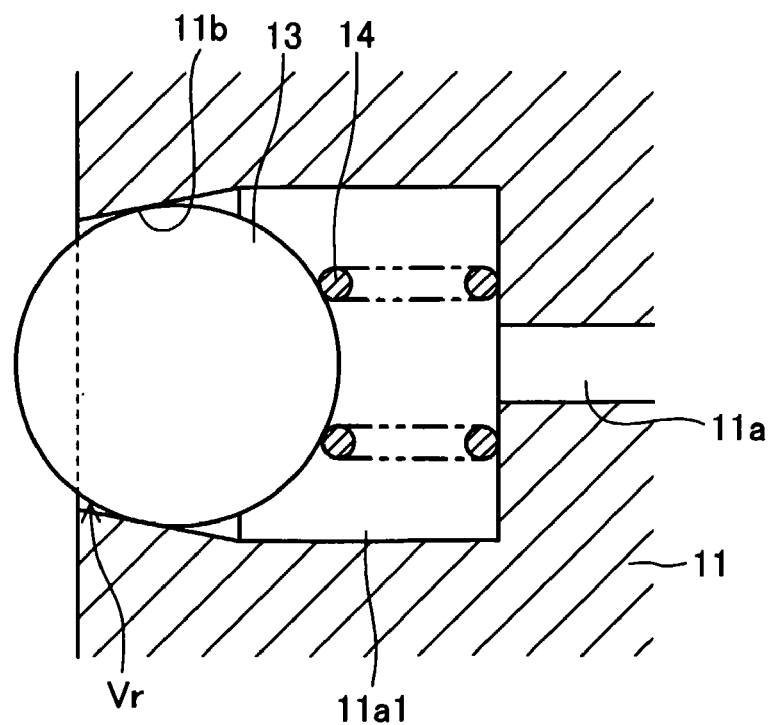

Furthermore, in this embodiment, a check valve Vr is provided in each of the inlet side end portions 11*a*1 of the introducing passageways 11*a*. As shown in FIG. 4, each of the check valves Vr comprises a ball valve 13 and a spring 14 to form a sealing means which opens (or releases) the introducing passageway 11*a* by (or when) mounting the vehicle wheel assembly 10 onto the axle hub 20 and which seals (or closes air tightly) the introducing passageway 11*a* by (or when) removing the vehicle wheel assembly 10 from the axle hub 20. The open (or release) of the introducing passageway 11*a* is accomplished by the event that the ball valve 13 is caused to depart from a valve seat 11*b* formed on the introducing passageway 11*a* when the ball valve 13 is pushed to move against the springs 14 by engaging with the bottom surface of the annular communicatively connected groove 21*f*, as shown in FIG. 4A. Also, the sealing (or closing) of the introducing passageway 11*a* is accomplished by the event that the ball valve 13 is caused to be pushed and moved by the springs 14 to seat on the valve seat 11*b* formed on the introducing passageway 11*a* when the ball valve 13 departs from the bottom surface of the annular communicatively connected groove 21*f*, as shown in FIG. 4B.

In this embodiment constructed as described above, when the axle hub 20 rotates about the cylindrical support-portion 51, the piston 30, the rod 43 and the cam followers 42 rotate integrally with the axle hub 20 so as to rotate relatively to the cam member 41, thereby moving in the axial direction. Accordingly, the rotating motion of the axle hub 20 can be converted into the reciprocating motion (movement) of the piston 30, which is capable of increasing/decreasing the volume of the pump chamber Ro. Thus, the air can be sucked into the pump chamber Ro through the intake passageway 21d which interposes the intake check valve Vi and discharged from the pump chamber Ro through the supplying passageway 21e which interposes the control valve Vo. The discharged air (pressurized air) can be supplied into the tire air chamber Ra of the vehicle wheel assembly 10 mounted onto the axle hub 20.

Meanwhile, in the apparatus At for controlling tire inflation pressure according to this embodiment, the outlet side end portions 21e1 of the supplying passageways 21e are opened on the outer end surface S1 of the vehicle in the disc-shaped flange portion 21B of the axle hub 20, and the inlet side end portions 11a1 of the introducing passageways 11a are opened on the inner end surface S2 of the vehicle in the wheel 11 of the vehicle wheel assembly 10. As best shown in FIG. 4A, outer end surface S1 forms a first substantially planar surface, and inner end surface S2 forms a second substantially planar surface adjacent the first plane. Because each of outer end surface S1 and inner end surface S2 are substantially planar and provided immediately adjacent each other, by (or when) mounting the wheel 11 of the vehicle wheel assembly 10 onto the disc-shaped flange portion 21B of the axle hub 20, the outlet side end portions 21e1 of the supplying passageways 21e and the inlet side end portions 11a1 of the introducing passageways 11a are joined air tightly to each other. Accordingly, when the vehicle wheel assembly 10 is being mounted onto the disc-shaped flange portion 21B of the axle hub 20, it is possible to improve easiness in mounting the vehicle wheel assembly 10 onto the disc-shaped flange portion 21B, compared with the conventional apparatus wherein the supplying passageway must be communicatively connected with the introducing passageway through the air tube.

Also, in this embodiment, the outlet side end portions 21e1 of the supplying passageways 21e and the inlet side end portions 11a1 of the introducing passageways 11a are provided at four positions respectively and are arranged at equiangular intervals so as to match with (or so as to be in accordance with) a mounting phase of the vehicle wheel assembly 10 relative to the axle hub 20. Therefore, when the vehicle wheel assembly 10 is being mounted onto the disc-shaped flange portion 21B of the axle hub 20, the relative adjustments are automatically performed between the positions of the outlet side end portions 21e1 of the supplying passageways 21e and the inlet side end portions 11a1 of the introducing passageways 11a.

Moreover, in this embodiment, at the joining portion between the outer end surface S1 of the vehicle of the disc-shaped flange portion 21B of the axle hub 20 and the inner end surface S2 of the vehicle of the wheel 11 of the vehicle wheel assembly 10, the annular communicatively connected groove 21f which communicatively communicates the outlet side end portions 21e1 of the supplying passageways 21e with the inlet side end portions 11a1 of the introducing passageways 11a and the ring-shaped sealing members 23, 24 which seal the annular communicatively connected groove 21f air tightly are provided. Accordingly, when the vehicle wheel assembly 10 is being mounted onto the disc-shaped flange portion 21B of the axle hub 20, it is not required to relatively adjust the positions of the outlet side end portions 21e1 of the supplying passageways 21e to the positions of the inlet side end portions 11a1 of the introducing passageways 11a. The reason is that even if the positions of the outlet side end portions 21e1 of the supplying passageways 21e and of the inlet side end portions 11a1 of the introducing passageways 11a are not relatively adjusted, the outlet side end portions 21e1 of the supplying passageways 21e are communicatively connected to the inlet side end portions 11a1 of the introducing passageways 11a through the annular communicating passageway 21f. Moreover, only two of sealing members are required (i.e., it is necessary to have only one ring-shaped (or annular) sealing member 23 provided along an outer circumference of the annular communicating passageway 21f and only one ring-shaped (or annular) sealing member 24 provided along an inner circumference of the annular communicating passageway 21f), otherwise four sealing members are required in order to seal each communicatively connected portion air tightly, if the number of the outlet side end portions 21e1 of the supplying passageways 21e and the inlet side end portions 11a1 of the introducing passageways 11a is four respectively. Thus, the apparatus At according to the present invention can have a simple structure.

Furthermore, in this embodiment, the check valves Vr are provided in the inlet side end portions 11a1 of the introducing passageways 11a. Each of the check valves Vr opens the introducing passageway 11a by (or when) mounting the vehicle wheel assembly 10 onto the axle hub 20 and closes the introducing passageway 11a air tightly by (or when) removing the vehicle wheel assembly 10 from the axle hub 20. Accordingly, even when the vehicle wheel assembly 10 is removed from the axle hub 20, the air pressure in the tire air chamber Ra is maintained, since the check valve Vr air tightly closes the introducing passageway 11a provided in the wheel 11 of the vehicle wheel assembly 10.

In the embodiment described above, four of the outlet side end portions 21e1 of the supplying passageways 21e and four of the inlet side end portions 11a1 of the introducing passageways 11a are provided. However, the number of the outlet side end portions 21e1 and the inlet side end portions 11a may not be limited to four, and a single outlet side end portion 21e1 and a single inlet side end portion 11a may be provided.

The invention claimed is:

1. An apparatus for controlling tire inflation pressure constructed in such a manner that pressurized air supplied from a pressure generating device is introduced into a tire air chamber of a vehicle wheel assembly through a supplying passageway provided in an axle hub and an introducing passageway provided in a wheel of the vehicle wheel assembly which is removably mounted onto a flange portion of the axle hub;
   wherein an outlet side end portion of the supplying passageway is opened on an outer end surface of the flange portion of the axle hub, and an inlet side end portion of the introducing passageway is opened on an inner side end surface of the wheel of the vehicle wheel assembly, and by mounting the wheel of the vehicle wheel assembly onto the flange portion of the axle hub, the outlet side end portion of the supplying passageway and the inlet side end portion of the introducing passageway are in fluid communication and air tightly joined to each other;
   wherein a surface formed by the outer end surface of the flange portion is substantially planar and extends along the opening of the outlet side end portion of the supplying passageway, and a surface formed by the inner side end surface of the wheel of the vehicle wheel assembly is substantially planar and extends along the opening of the inlet side end portion, wherein the first and second planes are adjacent each other,
   wherein the apparatus for controlling tire inflation pressure comprises a plurality of the outlet side end portions of the supplying passageways and a plurality of the inlet side end portions of the introducing passageways so that the outlet side end portions and the inlet side end portions are arranged at equiangular intervals so as to match with a mounting phase of the vehicle wheel assembly relative to the axle hub.

2. An apparatus for controlling tire inflation pressure according to claim 1, further comprising sealing means wherein the sealing means opens the introducing passageway when the vehicle wheel assembly is mounted onto the axle hub, and the sealing means closes the introducing passageway air tightly when the vehicle wheel assembly is removed from the axle hub, in the inlet side end portion of the introducing passageway.

3. An apparatus for controlling tire inflation pressure according to claim 2, wherein the sealing means comprises a check valve comprising a ball valve.

4. An apparatus for controlling tire inflation pressure constructed in such a manner that pressurized air supplied from a pressure generating device is introduced into a tire air chamber of a vehicle wheel assembly through a supplying passageway provided in an axle hub and an introducing passageway provided in a wheel of the vehicle wheel assembly which is removably mounted onto a flange portion of the axle hub;

wherein an outlet side end portion of the supplying passageway is opened on an outer end surface of the flange portion of the axle hub, and an inlet side end portion of the introducing passageway is opened on an inner side end surface of the wheel of the vehicle wheel assembly, and by mounting the wheel of the vehicle wheel assembly onto the flange portion of the axle hub, the outlet side end portion of the supplying passageway and the inlet side end portion of the introducing passageway are in fluid communication and air tightly joined to each other;

wherein a surface formed by the outer end surface of the flange portion is substantially planar and extends along the opening of the outlet side end portion of the supplying passageway, and a surface formed by the inner side end surface of the wheel of the vehicle wheel assembly is substantially planar and extends along the opening of the inlet side end portion, wherein the first and second planes are adjacent each other, wherein at a joining portion between the outer end surface of the flange portion of the axle hub and the inner end surface of the wheel of the vehicle wheel assembly, an annular communicatively connected passageway is formed which communicatively connects the outlet side end portion of the supplying passageway with the inlet side end portion of the introducing passageway.

5. An apparatus for controlling tire inflation pressure according to claim 4, further comprising sealing means, wherein the sealing means opens the introducing passageway when the vehicle wheel assembly is mounted onto the axle hub, and the sealing means closes the introducing passageway air tightly when the vehicle wheel assembly is removed from the axle hub, in the inlet side end portion of the introducing passageway.

6. An apparatus for controlling tire inflation pressure according to claim 5, wherein the sealing means comprises a check valve comprising a ball valve.

7. An apparatus for controlling tire inflation pressure according to claim 2, wherein the outlet side end portion of the supplying passageway is in fluid communication with an annular groove formed on the outer end surface of the flange portion, and the sealing means extends into the groove when the vehicle wheel assembly is mounted onto the axle hub.

8. An apparatus for controlling tire inflation pressure according to claim 5, wherein the outlet side end portion of the supplying passageway is in fluid communication with an annular groove formed on the outer end surface of the flange portion, and the sealing means extends into the groove when the vehicle wheel assembly is mounted onto the axle hub.

9. An apparatus for controlling tire inflation pressure according to claim 3, wherein when the wheel assembly is removed from the axle hub, the ball valve provided in the inlet side end portion of the introducing passageway extends beyond a plane formed by the inner side end surface of the wheel of the vehicle wheel assembly.

10. An apparatus for controlling tire inflation pressure according to claim 6, wherein when the wheel assembly is removed from the axle hub, the ball valve provided in the inlet side end portion of the introducing passageway extends beyond a plane formed by the inner side end surface of the wheel of the vehicle wheel assembly.

* * * * *